US008198988B2

(12) United States Patent
Hardacker et al.

(10) Patent No.: US 8,198,988 B2
(45) Date of Patent: Jun. 12, 2012

(54) SECURE LINK BETWEEN CONTROLLER AND DEVICE (75) Inventors: Robert L. Hardacker, Escondido, CA (US); David H. Bessel, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1035 days.

(21) Appl. No.: 11/985,802

(22) Filed: Nov. 16, 2007

(65) Prior Publication Data

US 2009/0128392 A1 May 21, 2009

(51) Int. Cl.
H04N 7/14 (2006.01)
H04N 5/44 (2011.01)
H04L 17/02 (2006.01)

(52) U.S. Cl. .......... 340/12.51; 348/734; 341/176
(58) Field of Classification Search .......... 348/734, 348/14.05; 340/5.1, 5.2, 5.21, 5.26, 815.6; 375/135–137, 142, 145–147; 334/8; 455/151.1–151.4; 463/29
See application file for complete search history.

(56) References Cited

U.S. PATENT DOCUMENTS

| 5,448,261 | A | * | 9/1995 | Koike et al. ........... 345/158 |
| 5,598,475 | A | | 1/1997 | Soenen et al. |
| 5,774,065 | A | | 6/1998 | Mabuchi et al. |
| 5,828,317 | A | | 10/1998 | Togashi |
| 6,181,252 | B1 | | 1/2001 | Nakano |
| 7,796,757 | B2 | * | 9/2010 | McClenny et al. ........... 380/239 |
| 7,957,528 | B2 | * | 6/2011 | Iwamura ........... 380/200 |
| 2003/0005329 | A1 | * | 1/2003 | Ikonen ........... 713/201 |
| 2003/0016119 | A1 | | 1/2003 | Teich |
| 2003/0110512 | A1 | | 6/2003 | Maari |
| 2003/0130906 | A1 | | 7/2003 | Maari |
| 2004/0070491 | A1 | | 4/2004 | Huang et al. |
| 2004/0073451 | A1 | | 4/2004 | Maari |
| 2004/0090315 | A1 | | 5/2004 | Mackjust et al. |
| 2004/0107167 | A1 | | 6/2004 | Maari |
| 2004/0268132 | A1 | | 12/2004 | Waris |
| 2005/0015467 | A1 | | 1/2005 | Noda |

(Continued)

FOREIGN PATENT DOCUMENTS

JP 08-182058 7/1996

(Continued)

OTHER PUBLICATIONS

U.S. Appl. No. 11/545,377, filed Oct. 10, 2006, Hardacker et al.

(Continued)

Primary Examiner — Brian Zimmerman
Assistant Examiner — Jerold Murphy
(74) Attorney, Agent, or Firm — Miller Patent Services; Jerry A. Miller (57) ABSTRACT In certain embodiments consistent with the invention, a method of associating a controlled device with a remote controller device involves providing a controlled device with a near field communication (NFC) module; providing a remote controller device with a near field communication (NFC) module; bringing the remote controller device into close enough proximity to the controlled device to establish an NFC communication link; communicating secret data between the remote controller device and the controlled device to establish an association between the remote controller device and the controlled device so that commands from the remote controller device to the controlled device will be accepted. This abstract is not to be considered limiting, since other embodiments may deviate from the features described in this abstract.

34 Claims, 6 Drawing Sheets

U.S. PATENT DOCUMENTS

| | | | |
|---|---|---|---|
| 2005/0025226 A1 | 2/2005 | Mizuguchi et al. | |
| 2005/0105734 A1 | 5/2005 | Buer et al. | |
| 2005/0195979 A1* | 9/2005 | Arling et al. | 380/274 |
| 2005/0253722 A1 | 11/2005 | Droms et al. | |
| 2006/0044153 A1 | 3/2006 | Dawidowsky | |
| 2006/0085635 A1 | 4/2006 | Park | |
| 2007/0021067 A1* | 1/2007 | Kim et al. | 455/41.2 |
| 2007/0152798 A1* | 7/2007 | Witkowski | 340/5.26 |

FOREIGN PATENT DOCUMENTS

| | | |
|---|---|---|
| WO | WO 01/71685 A1 | 9/2001 |
| WO | WO 2006/127598 A2 | 11/2006 |

OTHER PUBLICATIONS

U.S. Appl. No. 11/541,272, filed Sep. 26, 2006, Hardacker et al.
U.S. Appl. No. 11/591,922, filed Nov. 2, 2006, Hardacker et al.
U.S. Appl. No. 11/726,560, filed Mar. 22, 2007, Dawson et al.
U.S. Appl. No. 11/842,408, filed Aug. 21, 2007.
"K180, A Rolling Code 4-Channel UHF Remote Control," Siliconchip.com.au website; Nov. 2002.
"AVR411: Secure Rolling Code Algorithm for Wireless Link," Atmel; Apr. 2006.
"Thomson: DHD4000," Digital Spy, Apr. 13, 2005 Comment.
"Chamberlain Appeals Landmark Technology Ruling," Tom Wadsworth; DASMA; 2003; p. 42.
Press Release: "Near Field Technology jointly developed by Sony and Phillips approved as ISO/IEC International Standard," Dec. 8, 2003.
Logitech Harmony Advanced Universal Remote 720 Brochure; best available copy; cited in U.S. Appl. No. 11/726,560.
Logitech Products webpage for Harmony Remote Control; printed Feb. 23, 2007.

* cited by examiner

SECURE LINK BETWEEN CONTROLLER AND DEVICE

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The majority of US households receive television content through cable television systems or satellite television systems. Such systems have traditionally used a few OEM suppliers of hardware (e.g., set top boxes) and have not provided for integration of non-security navigation functionality of set-top boxes directly into digital TV sets.

Under this scenario, navigation and television operational functions are generally controlled by the remote control device supplied by the service provider. This relegates the television set to the role of a simple display device, often masking capabilities of the television device so that they are either forgotten or seldom used because of need for the use of multiple remote controls to access the functionality. This frustrates innovation within the television display device itself, which may readily be provided with capabilities that are inaccessible using generic "universal" remote controls such as those provided by the service providers (e.g., MSOs or Multiple Service Operators).

In addition, an entire business has arisen for third party remote control manufacturers who incorporate the remote control codes for multiple device manufacturers into their remote controls, thereby allowing them to control products built by someone else with no licensing requirement. In this case as well as the case of cable or satellite Set-top boxes (STBs), the remote control for the STB or the universal remote control often winds up being used to control multiple devices with the factory remote control for any particular device being put aside and going unused. In the case of a television set, for example, this can result in bypassing functionality and improved interfaces available from the television set's built in user interface.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

The term "processor", "controller", "CPU", "Computer" and the like as used herein encompasses both hard programmed, special purpose, general purpose and programmable devices and may encompass a plurality of such devices or a single device in either a distributed or centralized configuration without limitation.

In accordance with certain embodiment consistent with the present invention it is advantageous to associate a remote control device with a television receiver device or other controlled device so that either the associated remote control device is the only device that can control the controlled device, or so that only limited additional functionality can be realized by any remote control device that is not the associated remote control device. Embodiments consistent with the present invention can be used for many purposes including precluding access or full access to control of certain devices without use of the properly associated remote controller.

For purposes of this document, it will be assumed that the controlled device is a television set (TV) and the remote controller is a television set remote controller. However, other remote control operated consumer electronics devices can also serve as the controlled device (e.g., video tape players, STBs, set back boxes, audio equipment, DVD players, and other audio/video (A/V) devices). Hence, although the examples presented may reference a television device, or TV or television receiver, other such devices are also within the realm of embodiments consistent with the present invention.

In accordance with certain embodiments consistent with the invention rolling codes are used between the remote control and the controlled device (e.g. TV, STB, etc.). By dynamically changing the codes, only a properly associated remote control can control the controlled device products. Third party remote controls including those provided by an MSO or other service provider may no longer control the target controlled device. The codes may change with every button press or periodically based upon time (hourly, daily, weekly, etc.). In other embodiments, a limited set of control codes might be reserved for use by such universal devices, while other functionality is implemented using rolling codes. For example, the on/off function and perhaps other functions might remain universally available for the user's convenience, but other functions might be reserved for a properly associated remote controller device.

By use of rolling codes, if the algorithm driving the rolling codes is not known and/or the original seed is unknown, then it becomes virtually impossible to predict the future codes that will predictably control a controlled device such as a television receiver, so that only the properly associated remote control will be functional or fully functional with the television receiver.

In addition, an association technique is advantageously used to perform the association between the television (or other device) and the remote control. In accordance with certain embodiments, near field communication (NFC) technology such as the technology commonly known as "Felica™" (as originally developed by Sony Corporation and Royal Phillips Electronics) and originally standardized as ISO/IEC IS 18092 (and later as other international standards—all generally known as NFC or Felicia and all included herein by reference) enables contactless (i.e., without physical electrical connectors) communication between devices both in the clear and securely encrypted.

In one embodiment, an NFC reader/writer in the TV and an NFC micro/ROM in a remote control (RC) would allow for the exchange of a shared secret (i.e. a seed, encryption key, etc.) between the two devices. The TV could contain multiple secrets. The RC would be able to employ an exclusive OR (XOR), for instance, for use with the secret and acting upon the nominal command sent over the conventional IR (or RF) control link to the TV. The TV in turn XORs the received command and recovers the original command.

It is noted that IR RC code sets may be implemented so as to affect the IR wavelength of the transmitter, the modulation of the IR, the rate of modulation, the number of times the command is repeated, as well as the actual "code" sent. Other variations are also possible. Thus, pressing the any particular control key on a RC may result in a large number of possible of outputs as it is quite arbitrary as to how you represent an RC command, any of which are valid providing the controlled device understands the code.

Upon touching the RC to the TV at the appropriate location, or otherwise bringing the RC into close proximity to a selected portion of the TV, the secret is transmitted to the RC and can be loaded into the this simple crypto (XOR) engine allowing the two devices to communicate. This would thereby associate the RC with the TV and would allow the RC to control the TV. Each TV can be loaded with a separate secret or using an algorithm can generate its own secret. Due to the secure nature of an encrypted NFC communication, the RC does not have to actually be paired with the TV until it will be used. Hence, any appropriately NFC enabled RC can be "paired" with the TV simply by touching it to the TV or otherwise bringing it into close enough contact to initiate an NFC communication link. No limitation as to the number of RCs able to control the TV is envisioned. Thus, no problem will ensue if a RC is lost or damaged and a new one is procured, or if a more advanced RC is to be mated with a particular TV. While the simple XOR cryptography engine is envisioned in one embodiment as described above, other cryptography is also possible for use herein without limitation.

It is noted that secure NFC integrated circuit chips are tightly controlled due to their wide deployment in cash carrying smart cards thereby excluding all but licensees of the control codes. By employing different secrets or derivations of the secret in every TV, cracking the code in one TV doesn't facilitate a hacker or RC vendor as they still cannot mass deploy their own RCs. However, the ease with which another RC by the same manufacturer can be added should ensure customers are not inconvenienced.

While various embodiments are described in terms of the reader/writer (R/W) being in the TV and the micro/ROM in the RC, this should not be considered limiting. This implementation could be readily reversed with the R/W NFC device located in the RC and the micro/ROM located in the TV. In another alternative, a R/W device can be placed in both devices in which case the NFC devices are used to instantiate networks. An additional benefit is the ability to provide a secure link to the TV from the RC to enable secure purchases of items via the Internet in the case of a network enabled TV.

The term "rolling codes" and the like as used herein is intended to refer to the code set used by a remote control device to control a controlled device, such as a television set. The set of codes used to control various functions of the television set can be changed according to a predetermined algorithm so that either:

1) The mapping of codes to commands "rolls" or changes whenever a particular event occurs (e.g., use of any one member of the code set or a time related event). Once the codes roll, essentially a new set of codes is established that controls the operation of the controlled device. Thus, both the RC and the controlled device can contain a memory that stores a remote control code set corresponding to commands that can be issued by a user, such control code set's correlation to the commands being issued by the user via the user interface being "rolled" according to any suitable code rolling algorithm. Many suitable algorithms can be developed for the rolling operation, and the particular algorithm used is not critical to implementation of embodiments consistent with the present invention.

2) The codes being transmitted are encrypted using a set of "rolling" encryptions keys, and therefore are decrypted using a synchronized set of "rolling" decryption keys. OR 3) A combination of 1) and 2).

It is noted that either encryption keys themselves, seeds for random number generators or other secret information may be passed using the NFC techniques disclosed herein. For purposes of encrypted embodiments, (embodiments wherein the output codes are encrypted using an encryption algorithm) one or more keys can be stored and transferred during the association process to be described. In another embodiment, a seed can be passed that is used to derive an encryption key. In the case of a command mapping embodiment such as those disclosed, the secret information can be a seed number used by a pseudo-random number generator that is used to scramble the mapping from key to command code issued. Many other variations will occur to those skilled in the art upon consideration of the present teachings.

Figure 1:
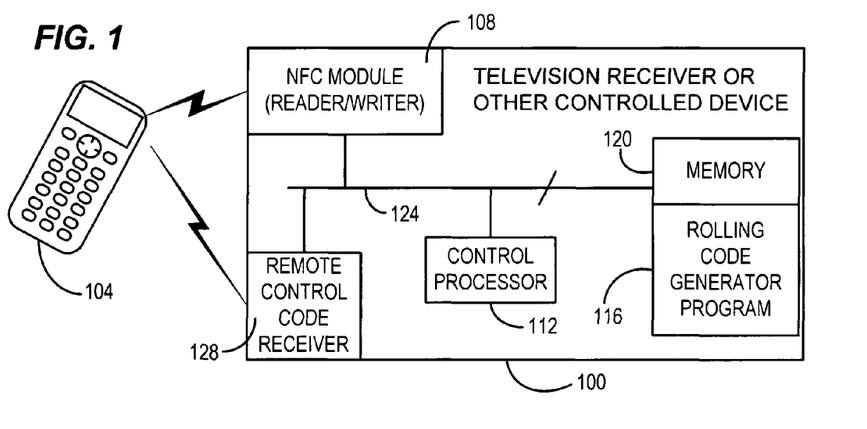
FIG. 1 is an exemplary block diagram of a remote control and television system consistent with certain embodiments of the present invention.

Turning now to FIG. 1, an exemplary embodiment of a system having a television receiver 100 and remote control 104 is depicted. In this illustration, as well as others in this document, functional elements that are not necessary to the understanding of the inventive concepts are omitted to simplify the illustration and facilitate understanding (e.g., television receiver 100 does not show a tuner, display, etc., but those skilled in the art will appreciate that they and other elements can be present and will understand how they interact with the illustrated components).

The TV receiver 100, or similar controlled device, in this embodiment utilizes an NFC communication module 108, which in this embodiment is embodied as a reader/writer (R/W) device (meaning either a device that reads or writes or both) such as those commercially available from Sony Corporation and other manufacturers. This device communicates with the RC 104, which contains another NFC device as will be described later, using NFC communication technology to exchange a secret that is used to associate the television set 100 with the RC 104. In one embodiment, this secret is a seed for a random number generator used in a rolling code algorithm that is implemented on a control processor 112 operating using stored instructions stored as a rolling code generator program 116 stored in a memory 120 such as a nonvolatile memory or disc drive. The secret may also or alternatively include an encryption or decryption key or key set or seed therefor if encrypted codes are used. As noted above, either the code mapping or the encryption or both can be used in connection with embodiments consistent with the present invention. In other embodiments, the association itself may be used so that the controlled device only responds to commands from an associated remote control, with or without rolling codes or encryption.

The control processor 112 and memory 120 may communicate with each other and with the NFC module using a serial or parallel bus 124 or using any other conventional communication arrangement (e.g., the NFC module may write directly to the memory 120 to store the secret information).

Once the association between the RC 104 and the TV 100 has been established, the RC 104 can communicate (with or without encryption and with or without using a set of rolling remote control codes) with a remote control code receiver 128 using, for example, infrared (IR) or radio frequency (RF) communications techniques. Any suitable rolling or fixed encryption method or rolling code mapping algorithm can be used which, based upon a triggering event, changes the code set or keys used by both the RC 104 and the TV 100. In one embodiment, each key pressed and received (acknowledged by the TV 100) will result in a change in codes or keys for the next key pressed. In other embodiments, the codes or keys will roll when specific keys or key combinations are entered. In another embodiment, the TV 100 or the remote 104 can periodically signal the other component that a code change is to take place. Other schemes can utilize time of day, date or any other function to trigger a code set change, thus "rolling" the codes based upon a suitable triggering event.

It is noted that the term "key" as used herein has dual meaning—one meaning being the buttons or keys pressed on a remote control device, and the other being the keys used in encryption and decryption. It is believed that the meaning will be clear from the context.

Should the RC 104 and the TV 100 loose their association, they can be reassociated by simply bringing the RC 104 into close proximity to the TV 100 so that NFC can be established and the association reestablished. This can involve exchange of the same secret information again, or involve exchange of a new secret (selected from a set of stored secret information, or generated at the time needed).

Figure 2:
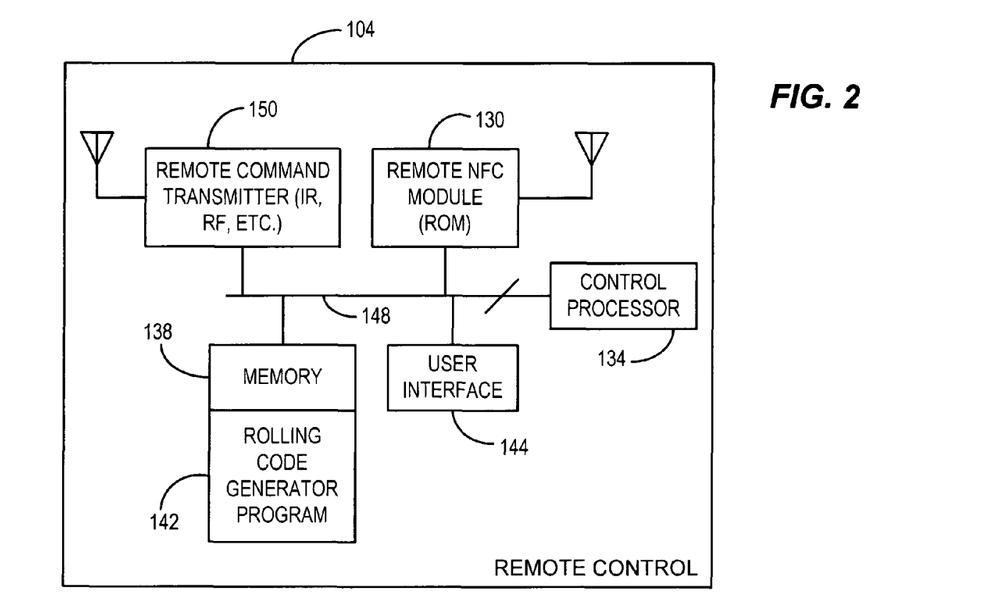
FIG. 2 is an exemplary block diagram of a remote control device consistent with certain embodiments of the present invention.

A programmed processor based embodiment of the remote control 104 used in this embodiment is depicted in FIG. 2 in which the remote control's NFC device is depicted as a Read Only Memory (ROM) 130 that is read by NFC R/W device 108 when the RC 104 is brought into close proximity. The contents of this ROM 130 can be the secret that is exchanged between the TV 100 and the RC 104, or can be information that can be used to derive the secret. In either case, the content of ROM 130 is read by NFC module 108 in order to associate the TV 100 with the RC 104 and to seed the rolling codes algorithm. The ROM may also or alternatively contain a seed or Key for an encryption algorithm used to encrypt the communication between the RC 104 and the TV 100 to further reduce the possibility of breeching the security of the communication. It is noted that the term "ROM" can be interpreted as a writable memory as well as a Read Only Memory and is used for the connotation of persistence of the information stored thereon for purposes of this document (e.g., an electrically alterable ROM).

RC 104 also operates, in this embodiment, under control of a control processor 134 having associated memory 138 which also stores a rolling code generator program 142 so that the rolling codes or keys generated by the RC 104 will match up with the rolling codes or keys generated by the TV 100. A user interface 144 (e.g., containing a number of control keys, buttons, pads, switches, etc. and possibly a display) for the RC 104 is also provided and communicates with the control processor and memory using any conventional interconnection including a bus 148 as depicted. Once a code set is established, entry of a command via the user interface 144 is translated to a code that is conveyed to the remote command transmitter 150 for conveyance to the TV 100. The memories 120 and 138 may also store a current remote control code set corresponding to commands that can be issued by a user. The control code set's correlation to the commands being issued by the user via the user interface 144 may be "rolled" according to any suitable code rolling algorithm or may be encrypted according to any suitable encryption algorithm or both.

It is noted that for ease of illustration, the command structure is depicted as one way communication; however, two way communications between the TV 100 and the RC 104 is also possible and may be desirable in order to assure synchronization between the two devices by providing for acknowledgements of commands and the like.

Figure 3:
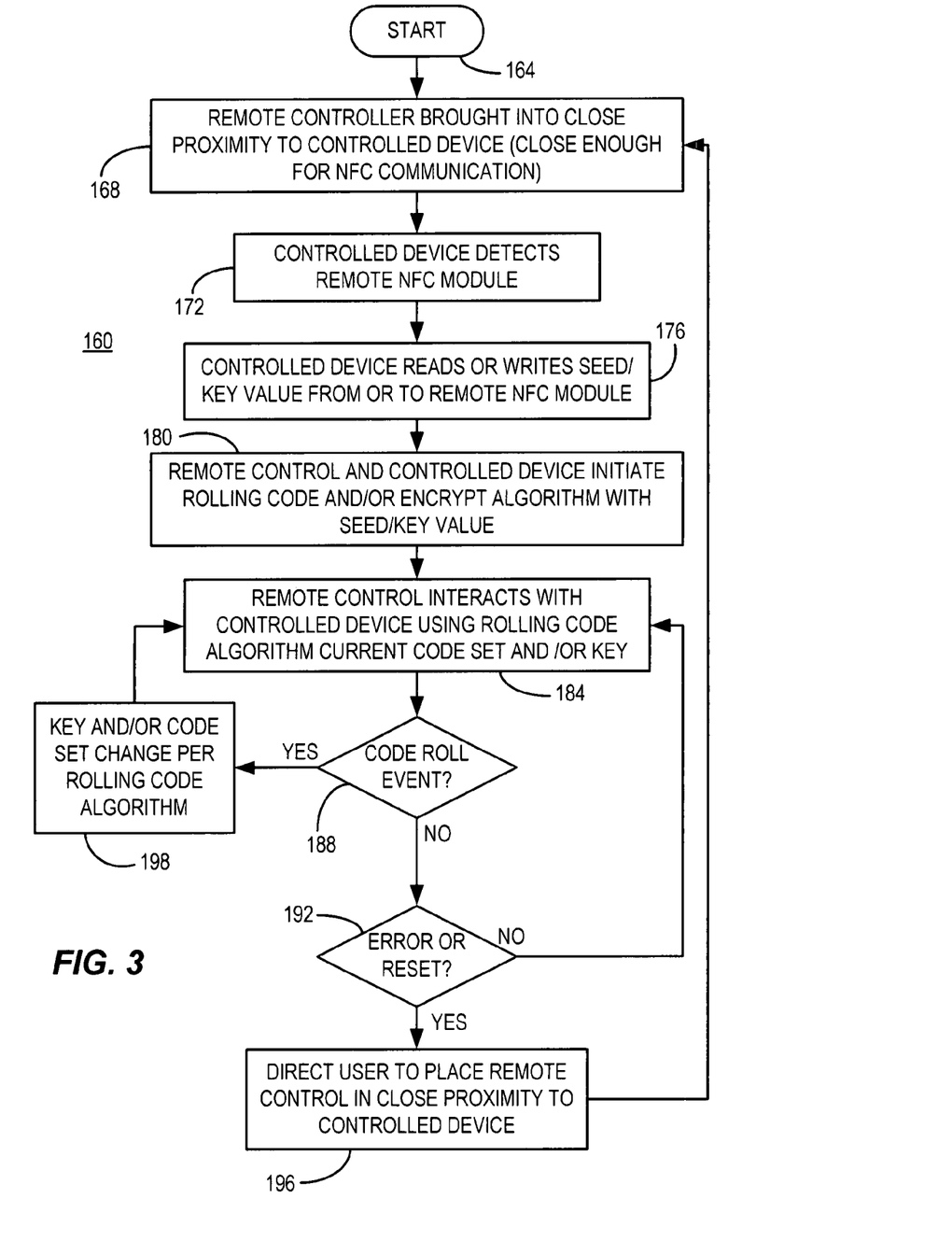
FIG. 3 is a flow chart of an exemplary process consistent with certain embodiments of the present invention.

Referring now to FIG. 3, a flow chart 160 depicts one operational mode for the system of RC 104 and TV 100 starting at 164. At 168, the two devices are associated with one another by bringing the RC 104 into close proximity with TV device 100 so as to initiate NFC communication between the two devices. When the TV detects the RC's NFC module at 172 (in this example, a ROM), the controlled device either reads the secret information from the ROM or writes secret information to the ROM at 176 so that both the TV 100 and RC 104 are armed with the same secret information and thus can generate the same set of encryption/decryption keys and/or the same set of rolling code sets or can otherwise be associated with one another in a manner such that the TV 100 accepts commands from the RC 104. At 180, the RC 104 and TV 100 can initiate encryption and/or the rolling code algorithm in synchronization using the secret information exchanged. At 184, the RC 104 is now able to communicate commands to the TV 100 using the current code set and/or the current encryption or other information that is related to the exchanged secret information.

At 188, if no event has occurred that triggers a rolling of the codes or encryption keys or other events, and if at 192 no error or reset has occurred, the RC 104 continues to interact with the TV 100 using the existing set of codes and/or encryption. If an error occurs and the TV 100 and RC 104 cease to properly communicate (as recognized by failure to operate according to command or by an error message), then control returns to 168 where the association is reinitiated. If a code roll event occurs at 188 indicating that the current code set is to be changed and/or an encryption key is to change, the change is carried out at both the TV 100 and the RC 104 at 198 and control functions resume at 184 using the new code set and/or key.

In the embodiment shown, the code roller is implemented in software or firmware, but could equally well be implemented in hardware. Similarly, the NFC modules can be implemented as hardware or software based devices or combinations thereof.

Figure 4:
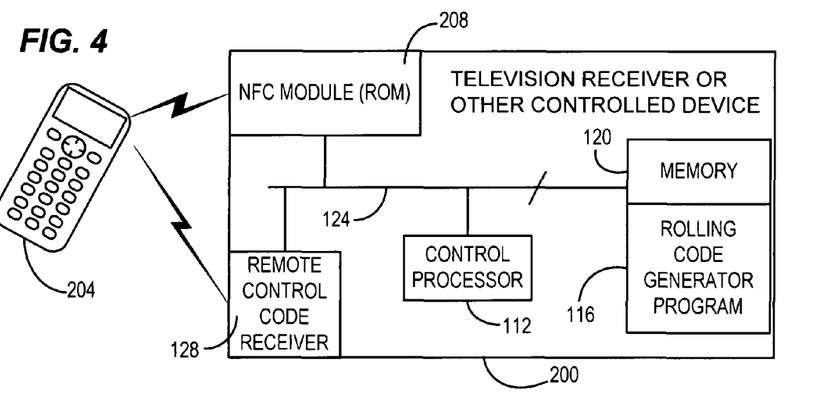
FIG. 4 is an exemplary block diagram of a remote control and television system consistent with certain embodiments of the present invention.

Turning now to FIG. 4, an exemplary embodiment of a system having a television receiver 200 and remote control 204 is depicted. Again, in this illustration, as well as others in this document, functional elements that are not necessary to the understanding of the inventive concepts are omitted to simplify the illustration and facilitate understanding (e.g., television receiver 200 does not show a tuner, display, etc., but those skilled in the art will appreciate that they are present and will understand how they interact with the illustrated components).

The TV receiver 200, or similar controlled device, in this embodiment utilizes an NFC communication module 208, which in this embodiment is embodied as a ROM device such as those commercially available from Sony Corporation and other manufacturers. This device communicates with the RC 204, which contains an NFC reader/writer device as will be described later, using NFC communication technology to exchange a secret that is used to associate the television set 200 with the RC 204. In one embodiment, this secret can be a set of encryption/decryption keys and/or a seed for a rolling code algorithm that is implemented on a control processor 112 operating using stored instructions stored as a rolling code generator program 116 stored in a memory 120 such as a nonvolatile memory or disc drive. The control processor 112 and memory 120 may communicate with each other and with the NFC module using a serial or parallel bus 124 or using any other conventional communication arrangement (e.g., the NFC module may write directly to the memory 120 to store the secret information).

Once the association between the RC 204 and the TV 200 has been established, the RC 204 can communicate. In one embodiment, the communication uses a set of rolling remote control codes with a remote control code receiver 128 using, for example, infrared (IR) or radio frequency (RF) communications techniques. In another embodiment, an encryption key is used for the communication, with or without a rolling of the keys. Any suitable rolling code algorithm can be used which, based upon a triggering event, changes the code set or keys used by both the RC 204 and the TV 200. In one embodiment, each key pressed and received (acknowledged by the TV 200) will result in a change in codes for the next key pressed. In another embodiment, the TV 200 or the remote control 204 can periodically signal the other component that a code change is to take place. Other schemes can utilize time of day, date or any other function to trigger a code set change, thus "rolling" the codes based upon a suitable triggering event.

Should the RC 204 and the TV 200 loose their association, they can be reassociated by simply bringing the RC 204 into close proximity to the TV 200 so that NFC can be established and the association reestablished.

Figure 5:
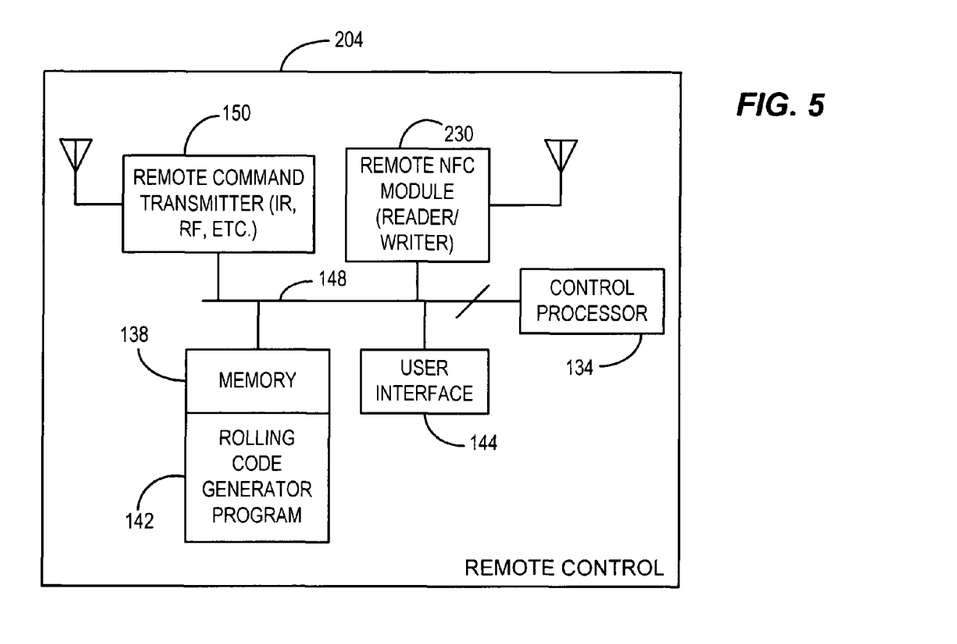
FIG. 5 is an exemplary block diagram of a remote control device consistent with certain embodiments of the present invention.

The remote control 204 used in this embodiment is depicted in FIG. 5 in which the remote control's NFC device is depicted as an NFC R/W module 230 that either reads from or writes to NFC ROM device 208 when the RC 204 is brought into close proximity. The contents of this ROM 208 can be the secret that is exchanged between the TV 200 and the RC 204, or can be information that can be used to derive the secret and can be used to seed the rolling codes and/or generate keys for encryption and decryption. In either case, the content of ROM 208 is read by or written to by NFC module 230 in order to associate the TV 200 with the RC 204 and to seed the rolling codes algorithm. The ROM may also or alternatively contain a seed or key for an encryption algorithm used to encrypt the communication between the RC 204 and the TV 200 to further reduce the possibility of breeching the security of the communication.

RC 204 also operates, in this embodiment; under control of a control processor 134 having associated memory 138 which may also store a rolling code generator program 142 so that the rolling codes generated by the RC 204 will match up with the rolling codes generated by the TV 200. A user interface 144 for the RC 204 is also provided and communicates with the control processor and memory using any conventional interconnection including a bus 148 as depicted. Once a code set is established, entry of a command via the user interface 144 is translated to a code that is conveyed to the remote command transmitter 150 for conveyance to the TV 200.

It is noted that for ease of illustration, the command structure is depicted as one way communication; however, two way communications between the TV 200 and the RC 204 is also possible and may be desirable in order to assure synchronization between the two devices by providing for acknowledgements of commands and the like. Encryption can be carried out using specialized hardware or by use of an encryption/decryption algorithm running as a computer program on processors 112 and 134.

Figure 6:
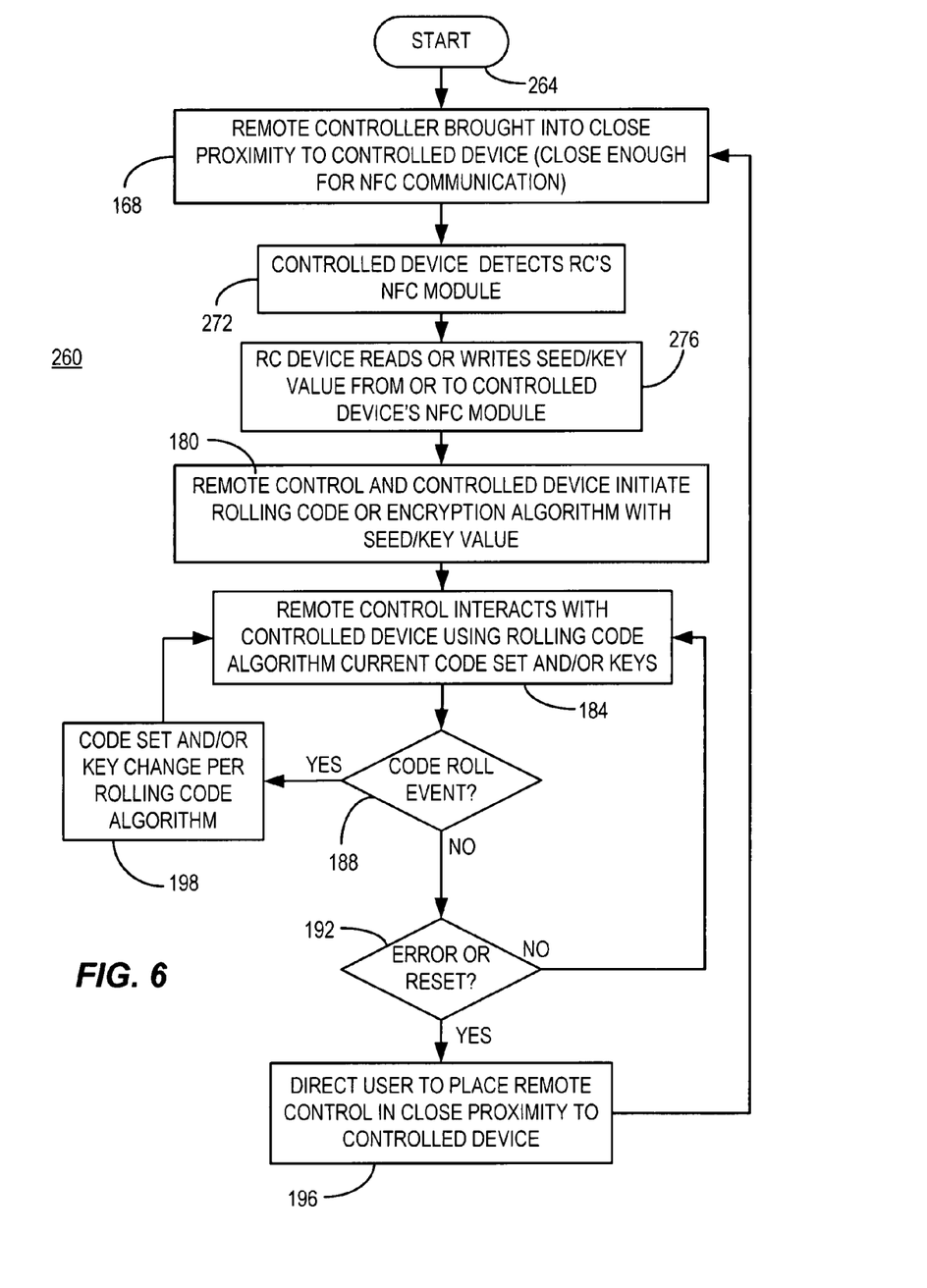
FIG. 6 is a flow chart of an exemplary process consistent with certain embodiments of the present invention.

Referring now to FIG. 6, a flow chart 260 depicts one operational mode for the system of RC 204 and TV 200 starting at 264. At 168, the two devices are associated with one another by bringing the RC 204 into close proximity with TV device 200 so as to initiate NFC communication between the two devices. When the RC 204 detects the TV 200's NFC module at 272, the RC either reads the secret information from the ROM or writes secret information to the ROM at 276 so that both the TV 200 and RC 204 are armed with the same secret information and thus can communicate. In one embodiment, this secret information is used as or to generate the same set of encryption/decryption keys and/or the same set of rolling code sets. At 180, the RC 204 and TV 200 can initiate encryption and/or the rolling code algorithm in synchronization using the secret information exchanged. At 184, the RC 204 is now able to communicate commands to the TV 200 using the current code set and/or the current encryption.

At 188, if no event has occurred that results in a rolling of the codes or encryption keys or other events, and if at 192 no error or reset has occurred, the RC 204 continues to interact with the TV 200 using the existing set of codes and/or encryption. If an error occurs and the TV 200 and RC 204 cease to properly communicate (as recognized by failure to operate according to command or by an error message), then control returns to 168 where the association is reinitiated. If a code roll or key roll event occurs at 188 indicating that the current code set is to be changed and/or an encryption key is to change, the change is carried out at both the TV 200 and the RC 204 at 198 and control functions resume at 184 using the new code set and/or key.

Figure 7:
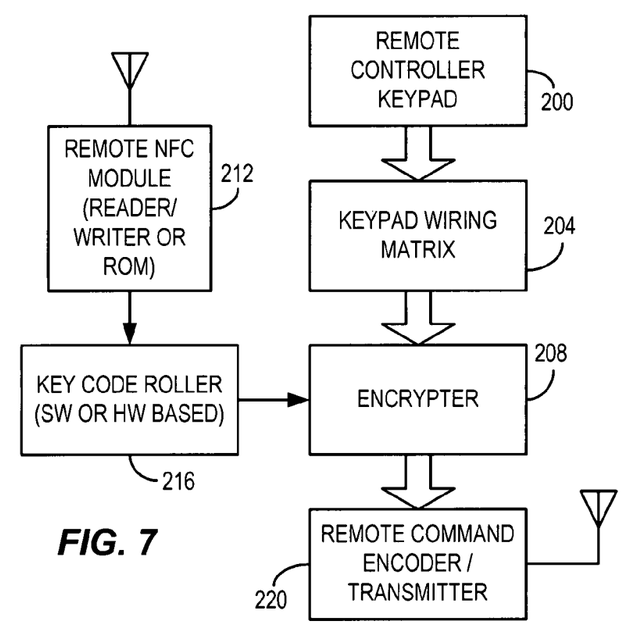
FIG. 7 is an exemplary block diagram of a remote controller device that uses the keypad wiring matrix to define codes for the remote controller in accordance with certain embodiments consistent with the present invention.

Referring now to FIG. 7, an exemplary block diagram of a remote controller device that uses the keypad wiring matrix to define codes for the remote controller in accordance with certain embodiments consistent with the present invention is depicted. It is noted that in certain remote controllers, a memory—per se—is not a required for storage of the control code set. In such an RC, each button push from the keypad 200 generates a unique output as a result of hard wiring through the keyboard wiring matrix 204 (which essentially serves as a hard wired "memory" that associates each button or key with a code). That unique output can be XORed or in any other suitable way "mixed" or encrypted at an encrypter 208 with a rolling encryption code. In this embodiment, the key can be rolled using a seed key obtained by use of the same techniques described previously wherein the remote control is brought into close proximity to the television so that a secret is exchanged using remote control NFC module 212 (which may be reader, and/or writer and/or memory device) which synchronizes a key (which may be one of multiple keys) or a seed (which may be one of multiple seeds) with the television set. The key is then rolled at key code roller 216 according to any suitable key rolling algorithm at 216 for use by encrypter 208. In this manner, the pressed key is encrypted and then encoded and transmitted at encoder/transmitter 220 to issue a command to the television set or other controlled device. This arrangement is an alternative to use of a writable memory that stores control codes to provide the ability to re-reprogram the unique outputs associated with a given button push. It is noted that in this embodiment, the keypad matrix, while not generally being considered a memory device, serves an equivalent purpose since it programs a particular code to a particular key, and hence can be considered a memory for purposes of certain embodiments of this invention.

Figure 8:
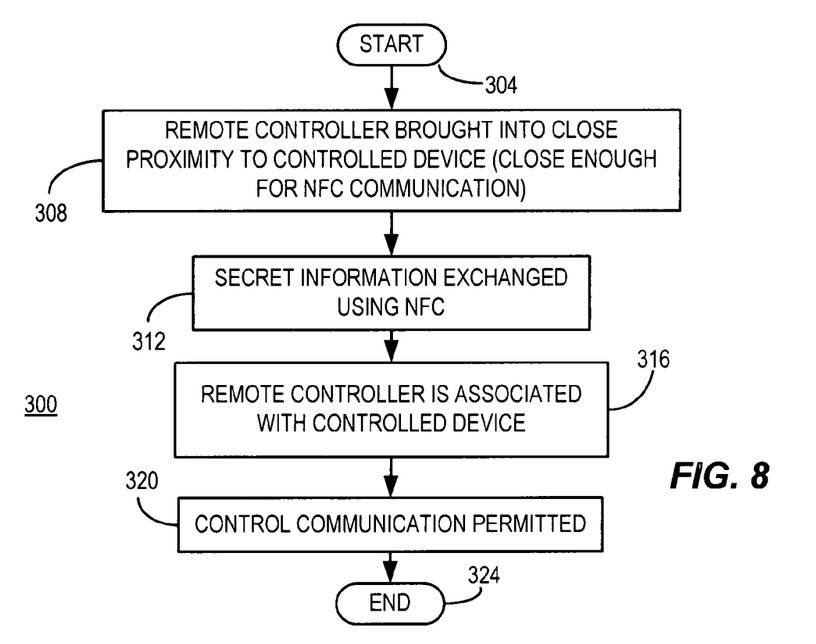
FIG. 8 is a flow chart of an exemplary process consistent with certain embodiments of the present invention.

The basic process used in accord with certain embodiments is depicted as process 300 of FIG. 8 starting at 304. In this process the remote controller device is brought into close proximity to the controlled device at 308 (e.g., the television 100) so that NFC communication can be established. When NFC communication is established, secret information is exchanged at 312 which associates the remote controller device with the controlled device at 316. Once this association takes place, communication of controlling information is permitted at 320 and the process is completed at 324. Many variations are possible in light of the present teachings.

In another alternative not pictured, a hybrid of the above arrangements can be utilized. In this embodiment, an R/W device can be placed in both the RC and the controlled devices in which case the NFC devices are used to instantiate networks. Other variations will occur to those skilled in the art without departing from embodiments of the present invention.

In the above embodiments, for ease of understanding, the remote controller devices 104 and television receiver devices 108 have been depicted as devices which carry out the remote control functions as processes running on a programmed processor. However, those skilled in the art will appreciate that many or most remote control systems utilize embedded logic which converts user inputs such as the pressing of buttons, touch pads or other user inputs into digital codes. For example, a press of a "1" on a numeric key pad may produce a logic output signal from the embedded logic of "10000001", while a press of a "2" on the numeric keypad may produce a logic output signal from the embedded logic circuit of "10000010", etc. Different manufacturers and different products may use different output codes to represent command or information inputs from the user interface.

Figure 9:
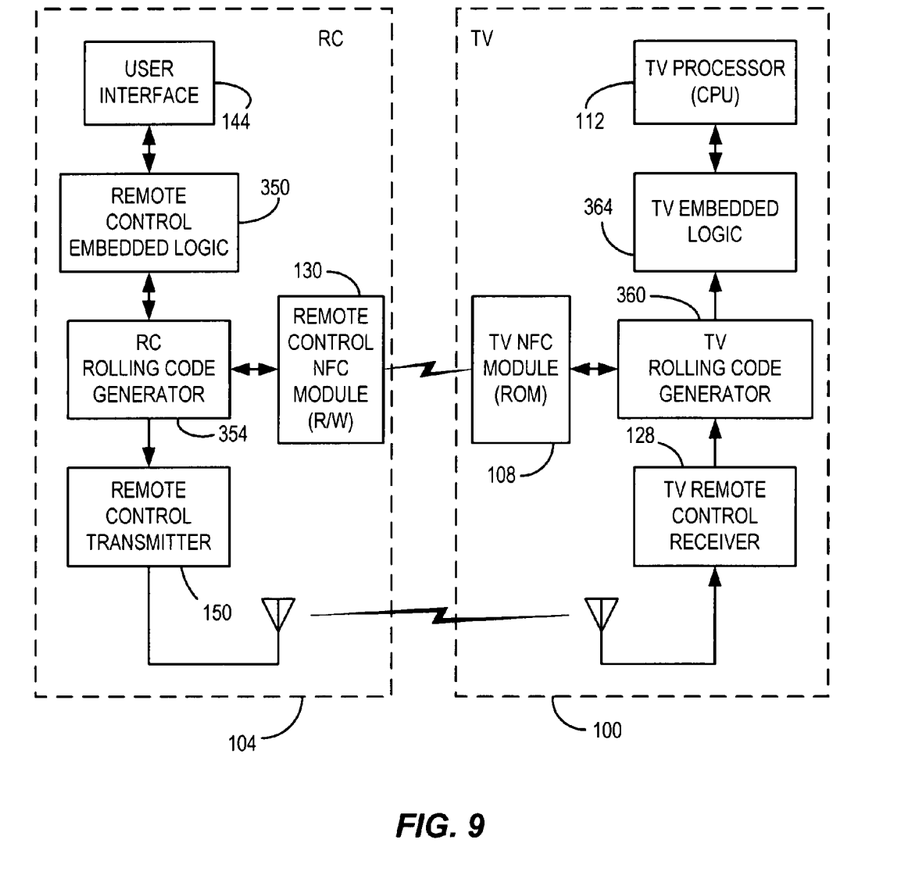
FIG. 9 is a block diagram of an embedded logic implementation consistent with certain embodiments of the present invention.

Referring now to FIG. 9, an exemplary embodiment utilizing such an embedded logic controller is depicted with remote controller 104 and television device 100 communicating wirelessly in a known manner using either infrared or RF communications. In this embodiment, the user interface 144 sends information to the remote controller embedded logic circuit 350 in response to the actuation of a particular button or key or other input manipulation carried out by the user. The remote control embedded logic circuit 350 generates a code representing that input manipulation and provides that code to a remote control rolling code generator 354. Remote control rolling code generator 354 encodes or encrypts the "standard" embedded logic output to a new value. The rolling codes can be changed an any number of ways in the manners described above, e.g., per button press or command, per session, per time period, etc. Alternatively, the codes can change not only from one value code to another value, but could also be changed to a code having a larger number of bits. For example, the 8 bit code used by way of example above could be changed to a 16 bit, 24 bit, 48 bit or other length code. The generator 354 could also drive the next stage with a variation on the modulation type, and/or clock frequency or other variations to add an additional layer of complexity to obfuscation of the actual code.

The remote control NFC module 130 provides the source of a seed for any rolling code change algorithm and alternatively can update the television device 100 to a fixed encryption or shared secret. Additionally, the NFC module can be used to verify that the television 100 is "legitimate". The remote control transmitter 150 transmits, using RF or IR communications or both, to the television remote control receiver. Such transmission and reception normally occurs using a fixed clock rate, and modulation, but, as noted above, variations in these parameters can also be introduced to further obfuscate the communication between the RC 104 and the TV receiver device 100.

The TV rolling code generator 360 performs the inverse function as that of generator 354 in that it converts the code received at its input to a decoded format representing a user command at its output which it supplies to TV embedded logic circuit 364. This command is then passed along to the TV processor 112 which implements the command. The TV NFC module, in this embodiment, is a ROM version of an NFC module. The remote control NFC module 130 reads codes from the TV to seed the process when the RC 104 and TV device 100 are brought into close proximity, as previously described. The seeds can be inherent to the manufacturer, downloaded from the Internet, programmed at setup or otherwise established without limitation.

Thus, in certain embodiments, a remote controller device that controls a controlled device has a user interface. A memory stores a remote control code set corresponding to commands that can be issued by a user via the user interface. A remote control code transmitter transmits a remote control code in response to the command issued by the user via the user interface. A code roller changes the relationship between the remote control code set and the commands that can be issued by the user upon occurrence of a roll triggering event, the code roller changing the relationship according to a predetermined algorithm that is seeded by seed data. A near field communication (NFC) module forms a part of the remote controller device that communicates with an NFC module of the controlled device to associate the remote controller device and the controlled device by communication of secret data used to seed the code roller.

In certain embodiments, the code roller has a programmed processor and a code rolling program operating on the programmed processor that changes the relationship between the remote control code set and the commands that can be issued by the user upon occurrence of a roll triggering event. In certain embodiments, the remote control code set is encrypted. In certain embodiments, the encryption is carried out using an encryption key forming a part of the secret data. In certain embodiments, the NFC module comprises an NFC compliant memory. In certain embodiments, the NFC module comprises an NFC compliant reader/writer. In certain embodiments, the roll triggering event comprises an event associated with executing the command. In certain embodiments, the roll triggering event comprises an event associated with time.

In another embodiment, a controlled device that is controlled by a remote controller device has a memory that stores a remote control code set corresponding to commands that can be issued by a user via a user interface of the remote controller device. A remote control code receiver receives a remote control code in response to the command issued by the user via the user interface and executes the command at the controlled device. A code roller changes the relationship between the remote control code set and the commands that can be issued by the user upon occurrence of a roll triggering event, the code roller changing the relationship according to a predetermined algorithm that is seeded by seed data. A near field communication (NFC) module forms a part of the controlled device that communicates with an NFC module of the remote controller device to associate the remote controller device and the controlled device by communication of secret data used to seed the code roller.

In certain embodiments, the code roller has a programmed processor and a code rolling program operating on the programmed processor that changes the relationship between the remote control code set and the commands that can be issued by the user upon occurrence of a roll triggering event. In certain embodiments, the remote control code set is encrypted. In certain embodiments, the encryption is carried out using an encryption key forming a part of the secret data. In certain embodiments, the NFC module comprises an NFC compliant memory. In certain embodiments, the NFC module comprises an NFC compliant reader/writer In certain embodiments, the roll triggering event comprises an event associated with executing the command. In certain embodiments, the roll triggering event comprises an event associated with time.

In another embodiment, a method of associating a controlled device with a remote controller device involves providing a controlled device with a near field communication (NFC) module; providing a remote controller device with a near field communication (NFC) module; bringing the remote controller device into close enough proximity to the controlled device to establish an NFC communication link; communicating secret data between the remote controller device and the controlled device to establish an association between the remote controller device and the controlled device; and communicating a command from the remote controller device to the controlled device using a code established in part by the secret data.

In certain embodiments, the secret data comprises a seed used by a code roller to roll command codes. In certain embodiments, the code roller comprises a programmed processor running a code rolling program that changes the relationship between the remote control code set and the commands that can be issued by the user upon occurrence of a roll triggering event. In certain embodiments, the remote control code set is encrypted. In certain embodiments, the encryption is carried out using an encryption key forming a part of the secret data. In certain embodiments, at least one of the NFC modules comprises an NFC compliant memory. In certain embodiments, at least one of the NFC modules comprises an NFC compliant reader/writer. In certain embodiments, the roll triggering event comprises an event associated with executing the command. In certain embodiments, the roll triggering event comprises an event associated with time. In certain embodiments, the controlled device comprises a television receiver device. In certain embodiments, a computer readable storage medium stores instructions which, when executed on one or more programmed processors, carry out any of the above processes.

In certain embodiments, remote controller device that controls a controlled device has a user interface that produces an output code as a result of user entry of a command. A near field communication (NFC) module forming a part of the remote controller device communicates with an NFC module of the controlled device to associate the remote controller device and the controlled device by communication of secret data. A remote control code transmitter transmits a remote control code in response to the command issued by the user via the user interface, wherein the remote control code transmitted is a function of the secret data, so that the controlled device is only responsive to remote control codes from a remote controller that has been associated with the controlled device.

In certain embodiments, the remote controller device also has a code roller that changes the relationship between the remote control code set and the commands that can be issued by the user upon occurrence of a roll triggering event, the code roller changing the relationship according to a predetermined algorithm that is a function of the secret data. In certain embodiments, the code roller has a programmed processor and a code rolling program operating on the programmed processor that changes the relationship between the remote control code set and the commands that can be issued by the user upon occurrence of a roll triggering event. In certain embodiments, the remote controller device has an encryption device, wherein the secret data are used to seed keys for the encryption device, and wherein the encryption device encrypts the remote control code prior to transmission by the remote control code transmitter. In certain embodiments, the NFC module comprises at least one of an NFC compliant memory, an NFC compliant reader and an NFC compliant writer. In certain embodiments, the roll triggering event can be an event associated with at least one of executing the command or with time. In certain embodiments, the user interface includes a memory that maps user entries to control codes. In certain embodiments, the user interface includes a wiring matrix or embedded logic or memory that maps user entries to control codes.

In another embodiment, a controlled device that is controlled by a remote controller device has a remote control code receiver that receives a remote control code in response to a command issued by a user via a user interface and executes the command at the controlled device. A near field communication (NFC) module forms a part of the controlled device that communicates with an NFC module of the remote controller device to associate the remote controller device and the controlled device by communication of secret data, so that the controlled device is only responsive to remote control codes from a remote controller that has been associated with the controlled device.

In certain embodiments, the controlled device has a code roller that changes the relationship between the remote control code set and the commands that are issued by the user upon occurrence of a roll triggering event, the code roller changing the relationship according to a predetermined algorithm that is seeded by seed data forming a part of the secret data. In certain embodiments, the code roller has a programmed processor and a code rolling program operating on the programmed processor that changes the relationship between the remote control code set and the commands that can be issued by the user upon occurrence of a roll triggering event. In certain embodiments, the remote control code set is received in an encrypted state. In certain embodiments, the encryption is carried out using an encryption key forming a part of the secret data. In certain embodiments, the controlled device has a decryption device, wherein the secret data are used to seed keys for the decryption device; and wherein the decryption device decrypts the received remote control code. In certain embodiments, the NFC module can be at least one of an NFC compliant memory, an NFC compliant reader and an NFC compliant writer. In certain embodiments, the roll triggering event comprises an event can be one of an event associated with executing the command and an event associated with time.

Those skilled in the art will recognize, upon consideration of the above teachings, that certain of the above exemplary embodiments are based upon use of one or more programmed processors, computers or other programmable devices such as processors 112 and 134. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits, embedded logic, and/or dedicated hard wired logic may be used to construct alternative equivalent embodiments.

Certain embodiments described herein, are or may be implemented using one or more programmed processors executing programming instructions that are broadly described above in flow chart form that can be stored on any suitable electronic or computer readable storage medium and/ or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated, embedded logic, hard wired logic, analog circuitry, pluralities of such devices and combinations of such devices in centralized or distributed configurations may be used to construct alternative equivalent embodiments. Other embodiments could be implemented using hardware component equivalents such as special purpose hardware and/or dedicated processors.

Software and/or firmware embodiments and key codes may be implemented using one or more programmed hardware or programmed processors executing programming instructions or utilizing data that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, wiring matrix, core memory and/or other equivalent volatile and non-volatile storage technologies).

While certain illustrative embodiments have been described, it is evident that many alternatives, modifications, permutations and variations will become apparent to those skilled in the art in light of the foregoing description.

What is claimed is:

1. A remote controller device that controls a controlled device, comprising:
   a user interface;
   a memory that stores a remote control code set corresponding to commands that can be issued by a user via the user interface;
   an encrypter configured to encrypt the remote control code set;
   a remote control code transmitter that transmits a remote control code in response to the command issued by the user via the user interface;
   a code roller that changes the relationship between the remote control code set and the commands that can be issued by the user upon occurrence of a roll triggering event, the code roller changing the relationship according to a predetermined algorithm that is seeded by seed data;
   where the code roller further changes an encryption key used for encryption of the remote control codes upon occurrence of the roll event; and
   a near field communication (NFC) module forming a part of the remote controller device that communicates with an NFC module of the controlled device to associate the remote controller device and the controlled device by communication of secret data used to seed the code roller, where the controlled device contains the secret data or derives the secret data that is communicated to the remote controller, and where the secret data includes an encryption key used by the encrypter to encrypt the code set;

and where the communication of secret data is initiated from the controlled device to the remote controller device when the remote controller NFC module is brought within range of the controlled device NFC module.

2. The remote controller device according to claim 1, wherein the code roller comprises:
  a programmed processor; and
  a code rolling program operating on the programmed processor that changes the relationship between the remote control code set and the commands that can be issued by the user upon occurrence of a roll triggering event.

3. The remote controller device according to claim 1, wherein the NFC module comprises at least one of an NFC compliant memory, an NFC compliant reader and an NFC compliant writer.

4. The remote controller device according to claim 1, wherein the roll triggering event comprises an event associated with at least one of executing the command and time.

5. A controlled device that is controlled by a remote controller device, comprising:
  a remote control code receiver that receives a remote control code in response to the command issued by the user via the user interface and executes a command at the controlled device in response thereto;
  a code roller that changes the relationship between the remote control code set and the commands that can be issued by the user upon occurrence of a roll triggering event, the code roller changing the relationship according to a predetermined algorithm that is seeded by seed data; and
  a near field communication (NFC) module forming a part of the controlled device that communicates with an NFC module of the remote controller device to associate the remote controller device and the controlled device by communication of secret data used to seed the code roller, where the controlled device contains the secret data or derives the secret data that is communicated to the remote controller, and where the secret data includes an encryption key used to encrypt the code set;
  and where the communication of secret data is initiated from the controlled device to the remote controller device when the remote controller NFC module is brought within range of the controlled device NFC module.

6. The controlled device according to claim 5, wherein the code roller comprises:
  a programmed processor; and
  a code rolling program operating on the programmed processor that changes the relationship between the remote control code set and the commands that can be issued by the user upon occurrence of a roll triggering event.

7. The controlled device according to claim 5, wherein the NFC module comprises at least one of an NFC compliant memory, an NFC compliant reader and an NFC compliant writer.

8. The remote controller device according to claim 5, wherein the roll triggering event comprises an event associated with at least one of executing the command and time.

9. A method of associating a controlled device with a remote controller device, comprising:
  providing a controlled device with a near field communication (NFC) module;
  providing a remote controller device with a near field communication (NFC) module;
  bringing the remote controller device into close enough proximity to the controlled device to establish an NFC communication link;
  communicating secret data between the remote controller device and the controlled device to establish an association between the remote controller device and the controlled device, where the controlled device contains the secret data or derives the secret data that is communicated to the remote controller, and where the secret data includes an encryption key used by the remote controller to encrypt a remote control code set;
  and where the communication of secret data is initiated from the controlled device to the remote controller device when the remote controller NFC module is brought within range of the controlled device NFC module; and
  communicating a command from the remote controller device to the controlled device using a code established in part by the secret data, where the command is encrypted using the encryption key.

10. The method according to claim 9, wherein the code roller comprises a programmed processor running a code rolling program that changes the relationship between the remote control code set and the commands that can be issued by the user upon occurrence of a roll triggering event.

11. The method according to claim 9, wherein at least one of the NFC modules comprises an NFC compliant memory.

12. The method according to claim 9, wherein at least one of the NFC module comprises an NFC compliant reader or writer.

13. The method according to claim 9, wherein the roll triggering event comprises at least one of an event associated with executing the command or an event associated with time.

14. The method according to claim 9, wherein the controlled device comprises a television receiver device.

15. A computer readable storage medium storing instructions which, when executed on one or more programmed processors, carry out a process according to claim 9.

16. A remote controller device that controls a controlled device, comprising:
  a user interface that produces an output code as a result of user entry of a command;
  a near field communication (NFC) module forming a part of the remote controller device that communicates with an NFC module of the controlled device to associate the remote controller device and the controlled device by communication of secret data:,
  where the communication of secret data is initiated from the controlled device to the remote controller device when the remote controller NFC module is brought within range of the controlled device NFC module;
  an encrypter configured to encrypt remote control codes forming part of a remote control code set;
  a code roller that changes the relationship between the remote control code set and the commands that can be issued by the user upon occurrence of a roll triggering event, the code roller changing the relationship according to a predetermined algorithm that is seeded by seed data;

where the code roller further changes an encryption key used for encryption of the remote control code upon occurrence of the roll event; and a remote control code transmitter that transmits encrypted remote control codes in response to the command issued by the user via the user interface, wherein the encrypted remote control code transmitted is a function of the secret data;

so that the controlled device is only responsive to remote control codes from a remote controller that has been associated with the controlled device.

17. The remote controller device according to claim 15, wherein the code roller comprises:
   a programmed processor; and
   a code rolling program operating on the programmed processor that changes the relationship between the remote control code set and the commands that can be issued by the user upon occurrence of a roll triggering event.

18. The remote controller device according to claim 15, wherein the NFC module comprises at least one of an NFC compliant memory, an NFC compliant reader and an NFC compliant writer.

19. The remote controller device according to claim 15, wherein the roll triggering event comprises an event associated with at least one of executing the command or with time.

20. The remote controller device according to claim 15, wherein the user interface includes at least one of a memory, a wiring matrix and embedded logic that maps user entries to control codes.

21. A controlled device that is controlled by a remote controller device, comprising:
   a remote control code receiver that receives a remote control code in response to a command issued by a user via a user interface and executes the command at the controlled device; and
   a near field communication (NFC) module forming a part of the controlled device that communicates with an NFC module of the remote controller device to associate the remote controller device and the controlled device by communication of secret data, where the controlled device contains the secret data or derives the secret data that is communicated to the remote controller, and where the secret data includes an encryption key used to encrypt the code set;
   and where the communication of secret data is initiated from the controlled device to the remote controller device when the remote controller NFC module is brought within range of the controlled device NFC module;
   so that the controlled device is only responsive to remote control codes from a remote controller that has been associated with the controlled device.

22. The controlled device according to claim 21, further comprising a code roller that changes the relationship between the remote control code set and the commands that are issued by the user upon occurrence of a roll triggering event, the code roller changing the relationship according to a predetermined algorithm that is seeded by seed data forming a part of the secret data.

23. The controlled device according to claim 22, wherein the code roller comprises:
   a programmed processor; and
   a code rolling program operating on the programmed processor that changes the relationship between the remote control code set and the commands that can be issued by the user upon occurrence of a roll triggering event.

24. The controlled device according to claim 22, further comprising a decryption device, and wherein the secret data are used to seed keys for the decryption device; and
   wherein the decryption device decrypts the received remote control code.

25. The controlled device according to claim 21, wherein the NFC module comprises at least one of an NFC compliant memory, an NFC compliant reader and an NFC compliant writer.

26. The controlled device according to claim 21, wherein the roll triggering event comprises an event comprises at least one of an event associated with executing the command and an event associated with time.

27. The remote controller device according to claim 1, where the remote control code transmitter comprises an infrared transmitter that transmits infrared signals, and where the IR code set is implemented to affect a characteristic of the transmitted infrared signals.

28. The remote controller device according to claim 27, where the characteristic of the transmitted infrared signal comprises a change in infrared wavelength.

29. The remote controller device according to claim 27, where the characteristic of the transmitted infrared signal comprises a change in a modulation rate.

30. The remote controller device according to claim 1, where the IR code set is implemented to affect a number of times the command is repeated.

31. The controlled device according to claim 5, where the remote control code transmitter comprises an infrared transmitter that transmits infrared signals, and where the IR code set is implemented to affect a characteristic of the transmitted infrared signals.

32. The controlled device according to claim 31, where the characteristic of the transmitted infrared signal comprises a change in infrared wavelength.

33. The controlled device according to claim 31, where the characteristic of the transmitted infrared signal comprises a change in a modulation rate.

34. The controlled device according to claim 5, where the IR code set is implemented to affect a number of times the command is repeated.

* * * * *